United States Patent
Kaneko et al.

(10) Patent No.: US 6,883,379 B2
(45) Date of Patent: Apr. 26, 2005

(54) ABSOLUTE-PRESSURE TYPE OF PRESSURE SENSOR

(75) Inventors: Yoshikazu Kaneko, Ohta-ku (JP); Hiroshi Nagasaka, Ohta-ku (JP)

(73) Assignee: Nagano Keiki Co., Ltd. (JP)

( * ) Notice: Subject to any disclaimer, the term of this patent is extended or adjusted under 35 U.S.C. 154(b) by 38 days.

(21) Appl. No.: 10/440,158

(22) Filed: May 19, 2003

(65) Prior Publication Data

US 2003/0213307 A1 Nov. 20, 2003

(30) Foreign Application Priority Data

May 17, 2002 (JP) ...................................... P2002-142407

(51) Int. Cl.⁷ ................................................ G01L 9/04
(52) U.S. Cl. ........................................ 73/720; 73/706
(58) Field of Search ........................ 73/700, 720, 721, 73/706

(56) References Cited

U.S. PATENT DOCUMENTS

| | | | | |
|---|---|---|---|---|
| 4,840,061 A | * | 6/1989 | Peltier ..................... | 73/152.21 |
| 4,986,861 A | * | 1/1991 | Nishida et al. ........... | 156/89.16 |
| 5,144,843 A | * | 9/1992 | Tamura et al. ................ | 73/727 |
| 5,319,980 A | | 6/1994 | Kremidas ..................... | 73/721 |
| 5,407,501 A | | 4/1995 | Koen et al. .................... | 156/64 |
| 5,783,748 A | | 7/1998 | Otani ........................... | 73/493 |
| 2001/0049965 A1 | | 12/2001 | Groger ........................ | 73/753 |

FOREIGN PATENT DOCUMENTS

EP    1 126 260    8/2001

* cited by examiner

*Primary Examiner*—Edward Lefkowitz
*Assistant Examiner*—Andre Allen
(74) *Attorney, Agent, or Firm*—Parkhurst & Wendel, L.L.P.

(57) ABSTRACT

An absolute-pressure type of pressure sensor is provided. The sensor has a pressure detecting device having a metal diaphragm. Strain gauges are disposed on one surface of the diaphragm, whose other surface is formed to receive fluid to be detected. The sensor comprises a lid, relay board, two seal rings, and input/output terminal. The lid provides a reference pressure space. The relay board is electrically connected to the gauge and composed of laminated ceramic members having both of through holes formed to pass through both sides thereof and a protrusion formed outwardly. The two seal rings are located to face the two sides of the board, respectively. The one seal ring air-tightly connects the relay board and the diaphragm. The other seal ring air-tightly connects the relay board and the lid. The terminal is electrically connected to the relay board and mounted on the protrusion of the relay board.

6 Claims, 5 Drawing Sheets

ABSOLUTE-PRESSURE TYPE OF PRESSURE SENSOR

BACKGROUND OF THE INVENTION

The present invention relates to a pressure sensor, and in particular, to an absolute-pressure type of pressure sensor which has the capability of measuring pressure in absolute values.

Conventionally, a variety of absolute-type of pressure sensors have been known. Of these, each of a Japanese Patent Laid-open (unexamined) Publication No. 1998-90096 (reference publication 1) and a Japanese Patent Laid-open (unexamined) Publication No. 1999-83655 (reference publication 2) discloses an absolute-pressure type of pressure sensor, in which a diffused semiconductor type of pressure sensing chip is liquid-encapsulated by a diaphragm, so that the encapsulating liquid prevents fluid from being contacted to the sensing chip.

Another Japanese Patent Laid-open (unexamined) 1999-295174 (reference publication 3) also discloses an absolute-pressure type of pressure sensor. This sensor employs a metal pressure case that functions as a lid. This case is formed to have a reference pressure space (vacuum space) located on a strain gauge side of a sensor chip. The opposite side of the sensor chip to its strain gauge is brought into contact with the fluid to be detected. Further, a hermetic seal or a feed-through capacitor is mounted to the pressure case so that lead wires are connected to the pressure case. An electrical signal flows out of the sensor chip to the lead wires in the hermetic seal or the feed-through capacitor by way of wires, a board, and lead wires, and then to terminals.

Still, a disclosure of another absolute-pressure type of pressure sensor is provided by U.S. Pat. No. 6,351,996 (reference publication 4). This pressure sensor has a reference sensor space which can be structured relatively easily, without using a metal lid. Practically, the reference pressure space is formed of a pre-mold packaged resin material in such a manner that adhesiveness between a lead frame and the resin material is utilized to seal the pressure reference space.

However, the foregoing various pressure sensors have encountered difficulties as follows. In the case of the absolute-pressure type of pressure sensor disclosed by the reference publications 1 and 2, to avoid air from being mixed with the enclosing liquid, it is required that during manufacturing processes, a space with which the sensor chip is charged be first subjected to vacuum pumping to realize a high vacuum therein, before being subjected to the liquid encapsulation. This way makes the manufacturing processes more complicated, and if the sealing diaphragm is broken, the entire piping will become polluted with the enclosing liquid.

The absolute-pressure type of pressure sensor disclosed by the reference publication 3 is structured complicatedly and needs a lot of electrical connections. In addition, further electrical connections should be placed within the pressure case that is formed with welding, which results in complicated assembling work of the sensor. Reliability will be reduced, which attributes to the fact that there are lots of electrical connections.

Further, in the case of the absolute-pressure type of pressure sensor disclosed by the reference publication 4, reliability of the sealing performance is low, due to the fact that the adhesiveness between the lead frame and the resin material gives the sealing of the pressure reference space.

Considering the above difficulties, as shown in FIGS. 9 to 11, the inventors of the present application provided an absolute-pressure type of pressure sensor, which is able to overcome the foregoing difficulties. To be specific, a strain gauge 9 is formed on one surface of a diaphragm 8 composing part of a pressure detecting device 1, around which a hermetic seal terminal 2 is fixedly coupled by welding. Wires 3 are used to establish electrical connections between an input/output terminal 7 of the hermetic seal terminal 2 and the strain gauge 9. After those connections, a metal-made lid 4 is disposed over the pressure detecting device 1 and welded to the hermetic seal terminal 2 in vacuo. A fluid receiving opening 6 is formed in the body of the device 1. This pressure sensor provides a reference pressure space 5 with a higher reliability, which is formed between the lid 4 and the pressure detecting device 1.

However, there is the drawback that mounting the pressure sensor is made difficult, because fluid receiving opening 6 agrees with the input/output terminal 7 in terms of their directions, along which the hole 6 is formed as well as the input/output terminal 7 is attached.

SUMMARY OF THE INVENTION

The present invention has been made in view of the above circumstances, and an object of the present invention is, therefore, to provide an absolute-pressure type of pressure sensor which can be formed in a more simplified structure with a high sealing performance under simplified manufacturing steps, thereby facilitating the mounting of the pressure sensor, maintaining a high reliability of the sensor, and detecting an absolute pressure of fluid to be detected with higher precision.

In order to accomplish the above object, as one aspect of the present invention, there is provided an absolute-pressure type of pressure sensor, in which a pressure detecting device having a metal diaphragm with two surfaces is placed, one of the two surfaces being formed to sustain a strain gauge placed thereon and the other surface being formed to contact fluid to be introduced for measurement, the pressure sensor comprising: a lid made of metal and disposed for providing a reference pressure space facing the strain gauge on the metal diaphragm; a relay board electrically connected to the strain gauge and composed of laminated ceramic members having both of through holes formed to pass through both sides of the relay board and a protrusion formed outwardly; two seal rings located to face the two sides of the relay board, respectively, one seal ring having two circumferential ends air-tightly connected with the one side of the relay board and a circumferential end of the diaphragm, the other seal ring having two circumferential ends air-tightly connected with the other side of the relay board and a circumferential end of the lid so that the reference pressure space is formed; and an input/output terminal electrically connected to the relay board and mounted on the protrusion of the relay board so that the input/output terminal extends outwardly. Preferably, the protrusion of the relay board is located to protrude outward more than edges of the two seal rings.

Accordingly, because the strain gauge is disposed on one surface of the diaphragm, which is opposite to the side in which fluid to be measured in introduce, the pressure of the fluid can be measured without coming into contact with the fluid. In addition, the two seal rings are used on both sides of the relay board to form the reference pressure space, with the result that the reference pressure space is kept to have a high air-tight performance. this will lead to measurement of absolute pressure of the fluid with precision. Further, the input/output terminal is connected to the protrusion of the reply board, whereby wiring for this pressure sensor is simplified, leading to lowered manufacturing cost.

It is also preferred that a wiring component placed on the relay board is electrically connected to the strain gauge through the through holes. This is also effective for simplifying the structure of this pressure sensor, because the through holes are used to electrically connect both the relay board and the strain gauge.

It is preferred that a cavity is formed as a recess on the other side of the relay board, the cavity providing a recessed surface on which the wiring component is disposed. Forming the cavity will shorten the distance between the surface (i.e, the cavity bottom) facing the lid on the relay board and the strain gauge, thus shorting the lead wires for the electric connections through the through holes. Accordingly, resistance to vibration of this pressure sensor is enhanced, whereby measurement accuracy will be raised as well.

Furthermore, it is preferred that the wiring component facing the lid on the relay board is located inward more than the other seal ring and a wiring pattern facing the diaphragm on the relay board is electrically connected to the input/output terminal. This construction makes it possible that metal vapor is prevented to adhere to the wiring on the reply board, the metal vapor being generated in a vacuum space where the lid is welded to the seal ring located on the lid-side surface of the relay board. Accordingly, a decrease in the insulation of the relay board can be suppressed, thus leading to higher-accuracy measurement of absolute pressure of the fluid.

By way of example, the input/output terminal may be arranged to protrude in a direction different from a direction for mounting the pressure detecting device. For instance, an angle made between both the directions is about 90 degrees. Hence, when this pressure sensor is mounted to a desired location at which fluid is measured, the input/output terminal is avoided from becoming obstacles to the mounting operations. It is therefore possible that the work for mounting the absolute-pressure type of pressure sensor is noticeably simplified.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENTS

Referring to the accompanying drawings, preferred embodiments of an absolute-pressure type of pressure sensor according to the present invention will now be explained.
First Embodiment Referring to FIGS. 1 to 4, a first embodiment according of the absolute-pressure type of pressure sensor will now be described.

The absolute-pressure type of pressure sensor has a pressure detecting device 11, a metal-made lid 13, a relay board 14, and an input/output terminal 15.

Figure 3:
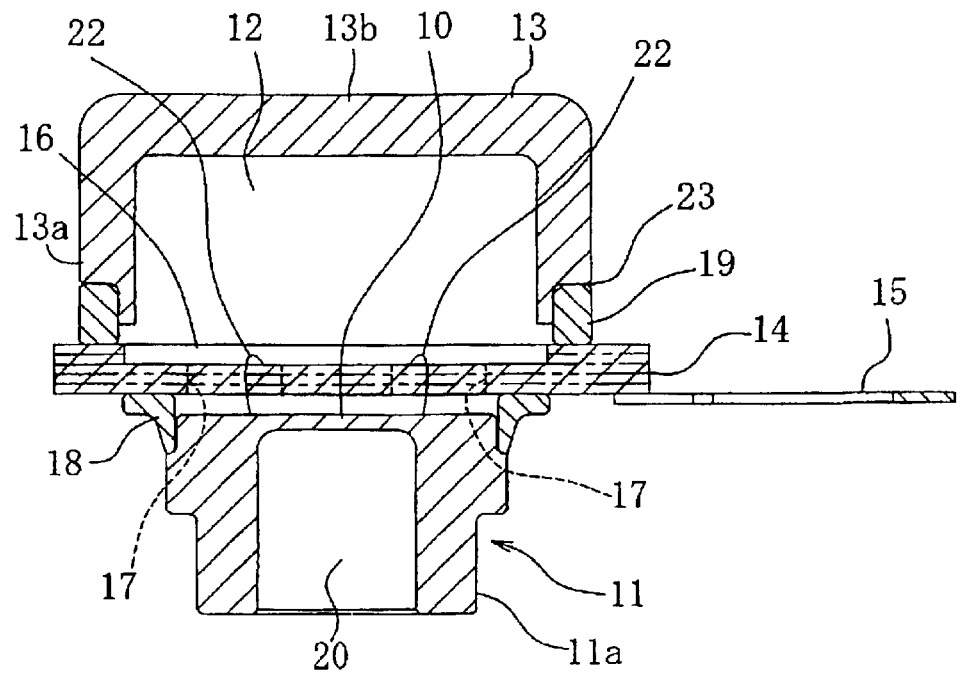
FIG. 3 shows a sectional view taken along a III—III line in FIG. 1.
Figure 4:
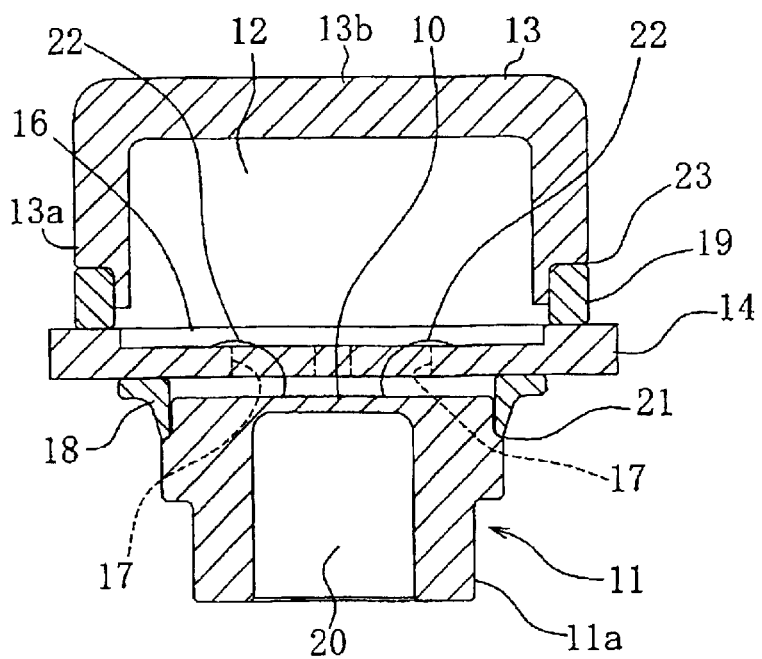
FIG. 4 shows another sectional view taken along a IV—IV line in FIG. 1.
Figure 5:
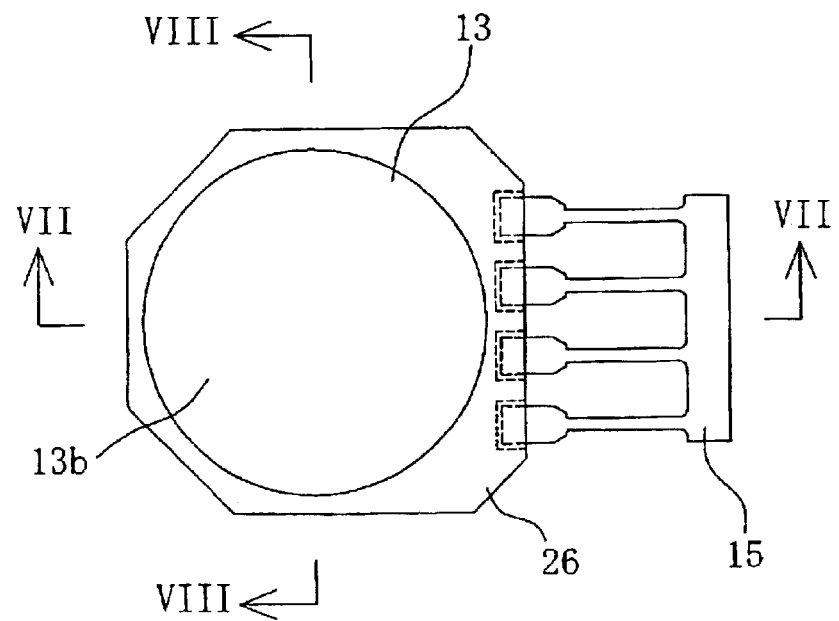
FIG. 5 is a plan view showing an absolute-pressure type of pressure senor according to a second embodiment of the present invention.
Figure 6:
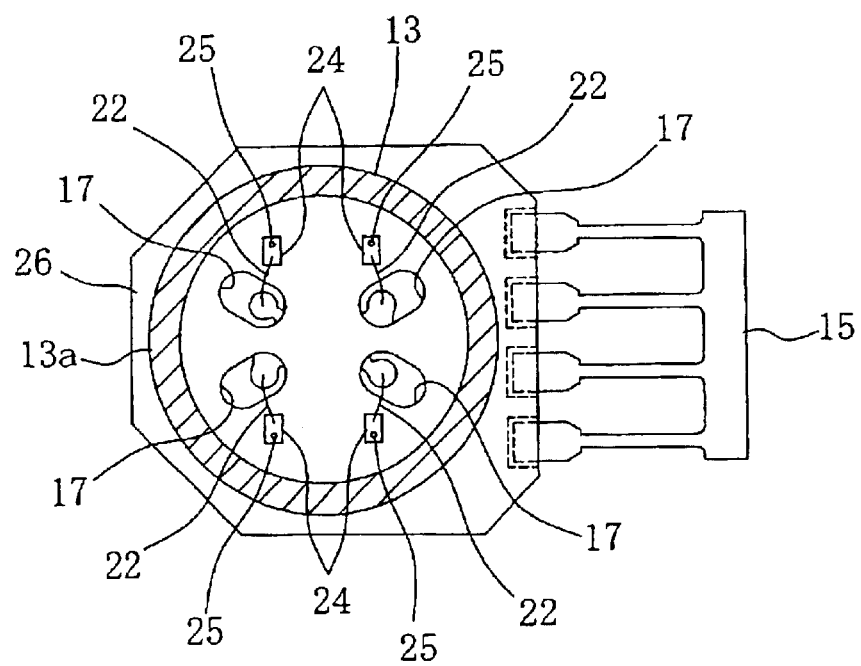
FIG. 6 is a plan view of the absolute-pressure type of pressure senor shown in FIG. 5 in which the sensor is shown by cutting a lid thereof in a perpendicular direction to the longitudinal direction of the sensor.
Figure 7:
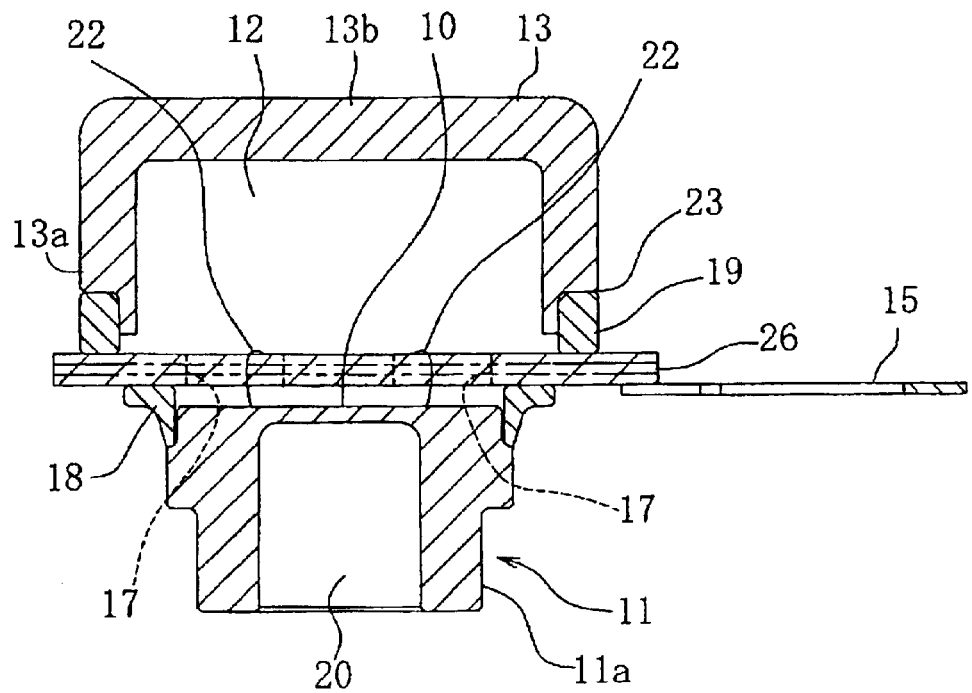
FIG. 7 shows a sectional view taken along a VII—VII line in FIG. 5.
Figure 8:
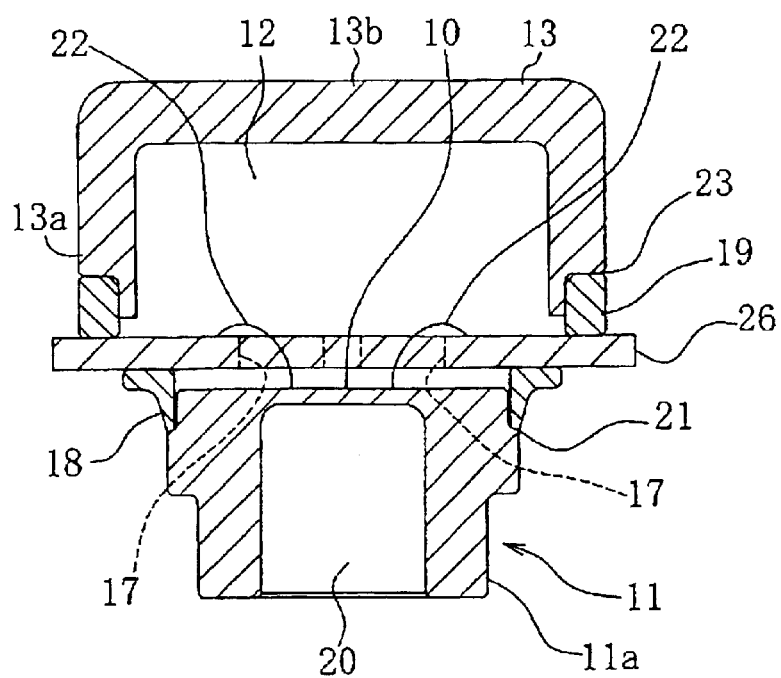
FIG. 8 shows another sectional view taken along a VIII—VIII line in FIG. 5.
Figure 9:
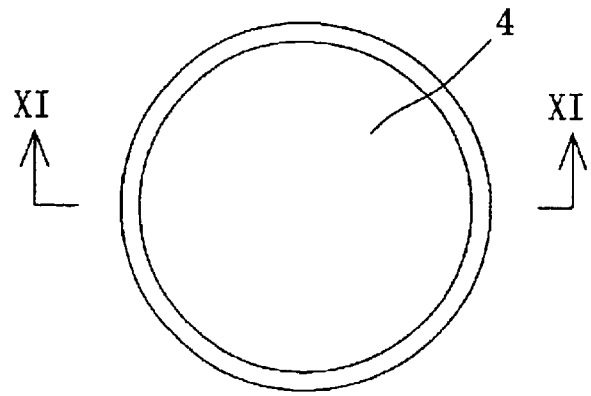
FIG. 9 shows a plan view of a conventional absolute-pressure type of pressure sensor.
Figure 10:
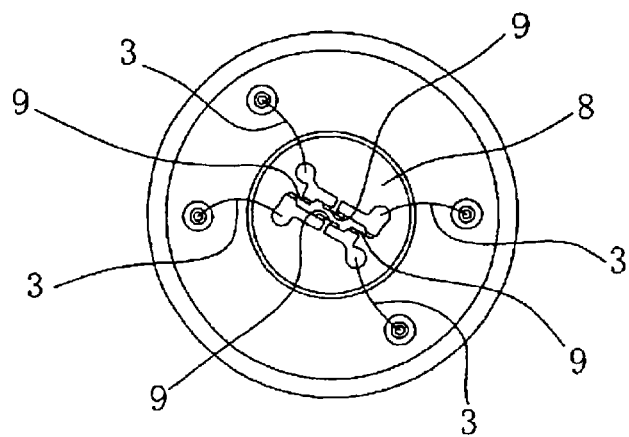
FIG. 10 shows a plan view of the conventional absolute-pressure type of pressure sensor shown in FIG. 9 in which a lid of the senor is removed.
Figure 11:
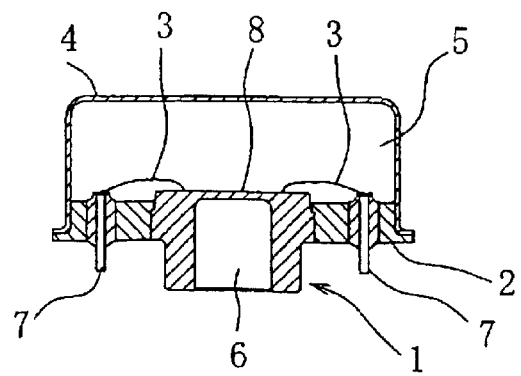
FIG. 11 shows a sectional view taken along a XI—XI line in FIG. 9.

Of these components, as typically shown in FIGS. 3 and 4, the pressure detecting device 11 has a cylindrical member 11a having a metal diaphragm 10 on one surface of which a strain gauge 9 is disposed, like the FIG. 10. The one surface is positioned on the opposite side of the cylindrical member 11a to a fluid receiving opening 20 formed from the opposite-side surface of the cylindrical member 11a. The metal lid 13 is disposed to form a reference pressure space 12 to enclose the strain gauge 9 placed on the metal diaphragm 10. The relay board 14 is electrically coupled with not only the strain gauge 9 but also the input/output terminal 15.

The relay board 14 is made of laminated ceramic plates, as shown in FIG. 3. Chain double-dashed lines in FIG. 3 pictorially explain the boundaries of such laminated ceramic plates. As shown in FIGS. 3 and 4, a circular-plate-like cavity 16 is formed as a recess in a central region of one surface of the relay board 14. At predetermined positions in a central part of the bottom of the cavity 16, a plurality of through holes 17 are formed so as to pass the relay board 14 between both sides thereof.

Figure 1:
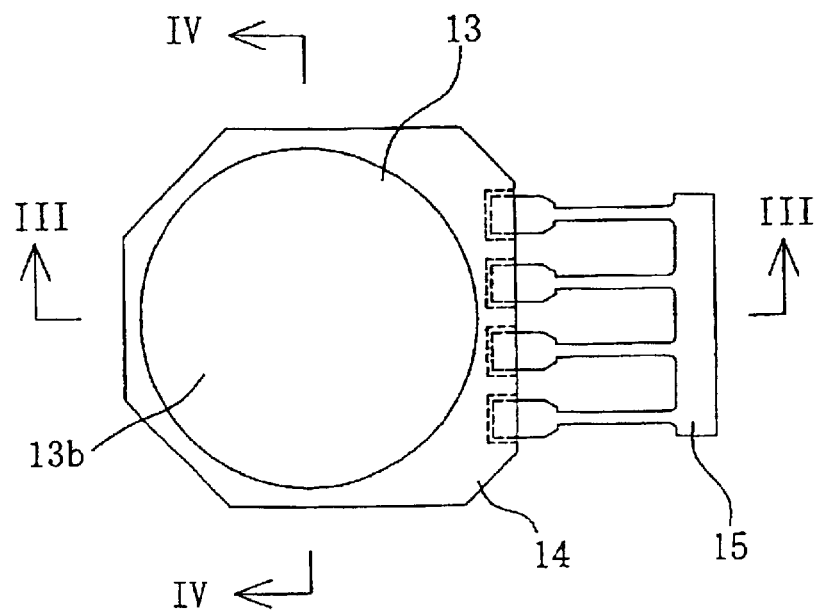
FIG. 1 is a plan view showing an absolute-pressure type of pressure senor according to a first embodiment of the present invention.
Figure 2:
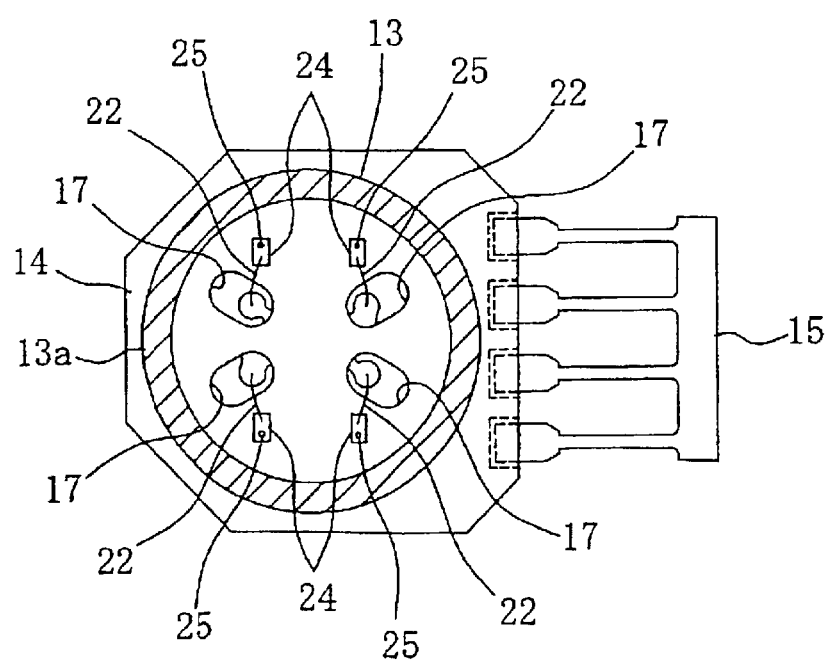
FIG. 2 is a plan view of the absolute-pressure type of pressure senor shown in FIG. 1 in which the sensor is shown by cutting a lid thereof in a perpendicular direction to the longitudinal direction of the sensor.

On both sides of the relay board 14 are provided metal seal rings 18 and 19, respectively, as shown in FIGS. 2 to 4. One seal ring 18, which is provided on one side of the relay board 14, is disposed between the relay board 14 and the cylindrical member 11a in such a manner that the seal ring 18 encloses air-tightly. The remaining seal ring 19, which is provided on the other side of the relay board 14, is disposed between the relay board 14 and the lid 13 so that the seal ring 19 encloses air-tightly the reference space 12. Each of the seal rings 18 and 19 is brazed to the surface of the relay board 14. It is preferred that the seal rings 18 and 19 are made of a nickel alloy (Kovar: registered trademark), 42-alloy, or others, which are close in their temperature coefficients (such as linier expansion coefficients) to the ceramics composing the relay board 14.

As shown in FIGS. 3 and 4, the pressure detecting device 11 has the cylindrical member 11a that functions as a device body of which one end is closed by the diaphragm 10. This cylindrical member 11a is integrally molded in one member by cutting or press-working a metal block. The cylindrical member 11a has the fluid receiving opening 20 that receives fluid and guides it to one side of the diaphragm 10. As described above, on the opposite-side surface of the diaphragm 10 to the fluid receiving opening 20, which is prevented from being contacted to the fluid, the strain gauge 9 is disposed (refer to FIG. 10). The strain gauge 9 is patterned as illustrated in FIG. 10, which are formed into thin layers, thereby their illustrations being omitted in FIGS. 3 and 4.

As typically shown in FIGS. 3 and 4, the outer circumferential part of the metal diaphragm 10, i.e., the outer shoulder portion of the cylindrical member 11a, is made to air-tightly couple with the metal seal ring 18, so that the pressure detecting device 11 is integrally coupled with the relay board 14. Practically, the outer shoulder portion of the cylindrical member 11a is fit into the seal ring 18, and then a joint 21 existing therebetween is welded over its entire circumference. This welding should be executed using welding which is higher in thermal density, so that the pressure detecting device 11 will be released from a hard thermal affection due to the welding. Such welding includes laser welding, argon arc welding, or others.

As shown in FIG. 2, the strain gauge 9 on the diaphragm 10 is electrically connected via pads 24 to an electrical circuit formed on the surface of the relay board 14, which is on the opposite side to the diaphragm 10 but is not shown in FIG. 2. To realize those connections, bonding wires 22 are passed through the through holes 17 of the relay board 14. Since the through holes 17 are utilized for electrically connecting the relay board 14 and the strain gauge 9, thus structurally simplifying the absolute-pressure type of pressure sensor.

In addition, the cavity 16 is formed on the surface of the relay board 14 that is opposed to the diaphragm 10, with the result that the distance between the circuit on the one side of the relay board 14 and the strain gauge 9 can be shortened compared to the configuration that no cavity is formed. This shortened distance will result in that the bonding wires 22, that is, electrical connections, are also shortened, raising resistance to vibration occurring at this pressure sensor, thus raising reliability of the pressure sensor.

The metal lid 13 is formed into a cylindrical member 13a, as shown in FIGS. 1 to 4, of which one end is closed by an edge plate 13b, the cylindrical member 13a and edge plate 13b being formed into an integral member by press-working or other processes. The opened edge of the cylindrical member 13a is fit into the metal seal ring 19, and a joint 23 formed therebetween is welded over its circumference. This welding makes it possible that a space enclosed by the lid 13, in which the strain gauge 9 is located, is held air-tightly.

Because this air-tight space, which serves as the reference pressure space 12, needs to be vacuated, the welding is conducted in a vacuum chamber. Specifically, after connecting the foregoing bonding wires 22, the metal lid 13 is covered onto the metal seal ring 19, and then placed in a vacuum chamber. In this state, the circumference of the joint 23 is subjected to electron beam welding for sealing in such a condition that electron fluxes are radiated onto the joint 23 in a degree of vacuum of $5\times10^{-2}$ Torr or less, preferably, $1\times10^{-3}$ Torr or less, so that the joint 23 is welded to connect both the lid 13 and the seal ring 19. As a result, the reference pressure space 12 enclosed by the metal lid 13, relay board 14, and the metal diaphragm 10 is provided as a vacuum space.

In addition, it is required that the reference pressure space 12 holds the same pressure for a long time. If the pressure in this space 12 changes, an output from this pressure sensor is forced to change as well. To avoid such a situation, organic matters such as resin and gasification components such as moisture should be removed from the reference pressure space as much as possible. Thus, before the foregoing sealing work, the metal lid 13 covered on the metal seal ring 19 is subject to baking at a high-temperature vacuum space, with the moisture removed. It is preferred that such a baking process is introduced before assembling the sensor.

The output/input terminals 15 are connected to a lower surface of an outward protrusion of the relay board 14 so as to extend in a direction in parallel with the relay board 14. The protrusion is located outwardly more than the edge of the seal rings 18 and 19. Preferably, the input/output terminal 15 is made of materials including a nickel alloy (Kovar: registered trademark), 42-alloy, or others, which are close in their temperature coefficients (such as linier expansion coefficients) to the ceramics composing the relay board 14. The input/output terminal is welded to the relay board 14. Although not shown in the figures, the wiring on the relay board 14 is connected to the input/output terminal 15 by way of via holes shown in FIG. 2 and via an internal mounting space formed in the relay board 14.

As clearly shown in FIG. 3, the input/output terminal 15 is arranged to protrude in a direction different from that of the cylindrical member 11a of the pressure detecting device 11. An angle made between both the different directions is about 90 degrees, as shown in FIG. 3. Accordingly, in cases where the cylindrical member 11a, that is, the pressure detecting device 11, is mounted to a desired location at which fluid is measured, the input/output terminal 15 is avoided from becoming obstacles to the mounting operations. It is therefore possible that the work for mounting the absolute-pressure type of pressure sensor is noticeably simplified.

In cases where the foregoing electron beam welding is performed in a vacuum space, meal vapor will appear at the joint 23 or thereabouts. If this metal vapor adheres to the wiring on the relay board 14, there is a possibility that the insulation resistance of the wiring decreases. Therefore, there should be a countermeasure that all the wiring including the input/output terminal 15 is prevented from being exposed directly to the metal vapor. In the present embodiment, such countermeasure is realized by a structure that the wiring pattern on one surface, which faces the metal lid 13, of the relay board 14 is located inwardly more than that of the metal seal ring 19, that is, within the reference pressure space 12 and the input/output terminal 15 is electrically connected to the wiring pattern on the other surface, which faces the metal diaphragm 10, of the relay board 14. This structure will avoid the metal vapor from adhering onto the wiring pattern on the relay board 14 as well as the connection part to the input/output terminal 15, thus keeping a high insulation resistance of the relay board 14.

The operations and advantages of the absolute-pressure type of pressure sensor according to the present embodiment will now be explained.

For measure pressure, the cylindrical member 11a of the pressure detecting device 11 is secured at a desired measurement position, such as a specified position on a pipe.

The fluid such as gas or liquid is guided into the pressure detecting device 11 through its fluid receiving opening 20 of the cylindrical member 11a, and then reaches the diaphragm 10. When the diaphragm 10 deforms elastically due to reception of pressure caused by the introduced fluid into the opening 20, the strain gauge 9 disposed behind the diaphragm 10 senses changes in deformations of the diagram 10 to output an electrical signal depending on the changes.

The outputted electrical signal is taken out of the sensor via the bonding wires 22, relay board 14, and input/output terminal 15.

Thus, as described, the absolute-pressure type of pressure sensor employs the relay board 14 composed of the laminated ceramic members and the metal seal rings 18 and 19 arranged and bonded to both sides of the relay board 14, respectively. One metal seal ring 18 is coupled with the metal diaphragm 10 so as to air-tightly enclose the outer circumferential portion of the diaphragm 10, while the other metal seal ring 19 is coupled with both the metal lid 13 and the relay board 14 so as to air-tightly enclose the reference pressure space 12. As a result, the reference pressure space 12 is held in a higher air-tight manner for a long time, so that the absolute pressure of the fluid to be measured can be measured with precision.

Second Embodiment

Referring to FIGS. 5 to 8, a second embodiment of the absolute-pressure type of pressure sensor according to the present invention will now be described.

The absolute-pressure type of pressure sensor in this embodiment is equipped with a relay board 26 formed differently from that in the first embodiment. Specifically, the relay board 26 has no cavity which has been provided in the relay board 14 according to the first embodiment. Hence both sides surfaces of the relay board 26 is flattened, thus simplifying the manufacturing steps more than those required for the relay board 14 according to the first embodiment.

The remaining components and their operations are identical to those according to the first embodiment, which are shown by the reference numerals which are the same as those in the first embodiment, thereby their detailed explanations being omitted.

For the sake of completeness, it should be mentioned that the embodiments explained so far are not definitive lists of possible embodiments of the present invention. The expert will appreciates that it is possible to combine the various construction details or to supplement or modify them by measures known from the prior art without departing from the basic inventive principle.

The entire disclosure of Japanese Patent Application No. 2002-142407 filed on May 17, 2002 including the specification, claims, drawings and summary is incorporated herein by reference in its entirety.

What is claimed is:

1. An absolute-pressure type of pressure sensor, in which a pressure detecting device having a metal diaphragm with two surfaces is placed, one of the two surfaces being formed to sustain a strain gauge placed thereon and the other surface being formed to contact fluid to be introduced for measurement, the pressure sensor comprising:

a lid made of metal and disposed for providing a reference pressure space facing the strain gauge on the metal diaphragm;

a relay board electrically connected to the strain gauge and composed of laminated ceramic members having both of through holes formed to pass through both sides of the relay board and a protrusion formed outwardly;

two seal rings located to face the two sides of the relay board, respectively, one seal ring having two circumferential ends air-tightly connected with the one side of the relay board and a circumferential end of the diaphragm, the other seal ring having two circumferential ends air-tightly connected with the other side of the relay board and a circumferential end of the lid so that the reference pressure space is formed; and an input/output terminal electrically connected to the relay board and mounted on the protrusion of the relay board so that the input/output terminal extends outwardly.

2. The absolute-pressure type of pressure sensor according to claim 1, wherein the protrusion of the relay board is located to protrude outward more than edges of the two seal rings.

3. The absolute-pressure type of pressure sensor according to claim 2, wherein a wiring component placed on the relay board is electrically connected to the strain gauge through the through holes.

4. The absolute-pressure type of pressure sensor according to claim 3, wherein a cavity is formed as a recess on the other side of the relay board, the cavity providing a recessed surface on which the wiring component is disposed.

5. The absolute-pressure type of pressure sensor according to claim 2, wherein the wiring component facing the lid on the relay board is located inward more than the other seal ring and a wiring pattern facing the diaphragm on the relay board is electrically connected to the input/output terminal.

6. The absolute-pressure type of pressure sensor according to claim 2, wherein the input/output terminal is arranged to protrude in a direction different from a direction for mounting the pressure detecting device.

* * * * *